United States Patent
Attari et al.

(10) Patent No.: US 10,598,395 B2
(45) Date of Patent: Mar. 24, 2020

(54) CLIMATE-CONTROL SYSTEM WITH GROUND LOOP

(71) Applicant: Emerson Climate Technologies, Inc., Sidney, OH (US)

(72) Inventors: Babak Attari, Fairborn, OH (US); Reza Khatami, Bellbrook, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 16/412,838

(22) Filed: May 15, 2019

(65) Prior Publication Data

US 2019/0353361 A1 Nov. 21, 2019

Related U.S. Application Data

(60) Provisional application No. 62/671,743, filed on May 15, 2018.

(51) Int. Cl.
*F24F 5/00* (2006.01)

(52) U.S. Cl.
CPC .... *F24F 5/0046* (2013.01); *F24F 2005/0057* (2013.01)

(58) Field of Classification Search
CPC ..... F24F 5/00; F24F 5/0046; F24F 2005/0057
See application file for complete search history.

(56) References Cited

U.S. PATENT DOCUMENTS 2,793,506 A     5/1957   Moody
3,782,132 A *   1/1974   Lohoff ............... F24F 5/0003
                                                    62/260

(Continued)

FOREIGN PATENT DOCUMENTS

CH         703290 A1    12/2011
CN        1385659 A     12/2002

(Continued)

OTHER PUBLICATIONS

Office Action regarding Chinese Patent Application No. 201680066979. X, dated Oct. 18, 2019. Translation provided by Unitalen Attorneys at Law.
International Search Report regarding International Application No. PCT/US2019/039304, dated Oct. 22, 2019.
Written Opinion of the International Searching Authority regarding International Application No. PCT/US2019/039304, dated Oct. 22, 2019.

(Continued)

*Primary Examiner* — Ana M Vazquez
(74) *Attorney, Agent, or Firm* — Harness, Dickey & Pierce, P.L.C.

(57) ABSTRACT

A climate-control system may include a working-fluid circuit and a cooling-fluid circuit. The working-fluid circuit may include a compressor, an outdoor heat exchanger, an expansion device, and an indoor heat exchanger. The compressor compresses a working fluid. The outdoor heat exchanger may receive compressed working fluid from the compressor. The expansion device may be disposed downstream of the outdoor heat exchanger. The indoor heat exchanger may be disposed downstream of the expansion device and upstream of the compressor. The cooling-fluid circuit may contain a cooling fluid in a heat transfer relationship with working fluid in the working-fluid circuit. The cooling-fluid circuit may include an underground heat exchanger conduit embedded in earth below an earth ground surface. The underground heat exchanger may selectively receive the cooling fluid such that heat from the cooling fluid is transferred to the earth.

16 Claims, 2 Drawing Sheets

(56) References Cited

U.S. PATENT DOCUMENTS

| | | |
|---|---|---|
| 4,209,998 A | 7/1980 | Shaw |
| 4,327,560 A | 5/1982 | Leon et al. |
| 4,532,854 A | 8/1985 | Foster |
| 4,899,555 A | 2/1990 | Shaw |
| 5,095,712 A | 3/1992 | Narreau |
| 5,103,650 A | 4/1992 | Jaster |
| 5,261,251 A * | 11/1993 | Galiyano .............. F24F 5/0046 62/176.6 |
| 5,729,994 A | 3/1998 | Mukaiyama et al. |
| 6,053,715 A | 4/2000 | Hirano et al. |
| 6,070,421 A | 6/2000 | Petrovich et al. |
| 6,231,316 B1 | 5/2001 | Wakisaka et al. |
| 6,758,057 B2 | 7/2004 | Vince, II et al. |
| 7,096,929 B2 | 8/2006 | Clarksean |
| 7,721,562 B2 | 5/2010 | Lifson et al. |
| 7,874,499 B2 | 1/2011 | Lochtefeld |
| 8,020,402 B2 | 9/2011 | Pham et al. |
| 8,091,381 B2 | 1/2012 | Boiarski et al. |
| 8,181,470 B2 | 5/2012 | Narayanamurthy et al. |
| 8,528,345 B2 | 9/2013 | Parsonnet et al. |
| 8,671,703 B2 | 3/2014 | Mitra et al. |
| 8,713,963 B2 | 5/2014 | Yanik |
| 9,212,834 B2 | 12/2015 | Parsonnet et al. |
| 9,353,980 B2 | 5/2016 | Ignatiev |
| 9,441,861 B2 | 9/2016 | Diamond et al. |
| 9,470,435 B2 | 10/2016 | Hinde et al. |
| 9,599,377 B2 * | 3/2017 | Kato ....................... B29C 43/18 |
| 9,709,302 B2 | 7/2017 | Martin et al. |
| 2002/0174673 A1 * | 11/2002 | Wilkinson ................ F24D 5/12 62/260 |
| 2002/0187050 A1 | 12/2002 | Narney et al. |
| 2004/0159119 A1 | 8/2004 | Hu |
| 2005/0204773 A1 | 9/2005 | Imai et al. |
| 2005/0235664 A1 | 10/2005 | Pham |
| 2006/0010904 A1 | 1/2006 | Nieter et al. |
| 2008/0034760 A1 | 2/2008 | Narayanamurthy et al. |
| 2008/0078192 A1 | 4/2008 | Ignatiev et al. |
| 2008/0078204 A1 | 4/2008 | Ignatiev |
| 2008/0116289 A1 | 5/2008 | Lochtefeld |
| 2008/0245505 A1 | 10/2008 | Yamaguchi et al. |
| 2009/0007589 A1 | 1/2009 | Takegami et al. |
| 2009/0173336 A1 | 7/2009 | Leifer et al. |
| 2009/0297377 A1 | 12/2009 | Stover et al. |
| 2010/0132399 A1 | 6/2010 | Mitra et al. |
| 2010/0199715 A1 | 8/2010 | Lifson et al. |
| 2010/0263393 A1 | 10/2010 | Chen et al. |
| 2011/0023514 A1 | 2/2011 | Mitra et al. |
| 2011/0048041 A1 | 3/2011 | Asprovski et al. |
| 2011/0094259 A1 | 4/2011 | Lifson et al. |
| 2011/0113804 A1 | 5/2011 | Chin et al. |
| 2011/0135509 A1 | 6/2011 | Fields et al. |
| 2011/0138825 A1 | 6/2011 | Chen et al. |
| 2011/0139794 A1 | 6/2011 | Pham et al. |
| 2011/0144944 A1 | 6/2011 | Pham |
| 2011/0174014 A1 | 7/2011 | Scarcella et al. |
| 2011/0232890 A9 | 9/2011 | Gering et al. |
| 2012/0117988 A1 | 5/2012 | Mitra et al. |
| 2012/0167602 A1 | 7/2012 | Taras et al. |
| 2012/0227427 A1 | 9/2012 | Liu et al. |
| 2012/0285185 A1 | 11/2012 | Huff |
| 2012/0318008 A1 | 12/2012 | Liu et al. |
| 2013/0298593 A1 | 11/2013 | Christensen |
| 2014/0216102 A1 | 8/2014 | Ignatiev et al. |
| 2014/0326018 A1 | 11/2014 | Ignatiev |
| 2015/0176872 A1 | 6/2015 | Goenka |
| 2016/0231035 A1 | 8/2016 | Lee et al. |
| 2017/0058773 A1 | 3/2017 | Vaisman |
| 2017/0074567 A1 | 3/2017 | Ali et al. |
| 2017/0138643 A1 | 5/2017 | Ignatiev et al. |
| 2019/0242657 A1 | 8/2019 | Ignatiev et al. |
| 2019/0264933 A1 | 8/2019 | Ignatiev et al. |

FOREIGN PATENT DOCUMENTS

| | | |
|---|---|---|
| CN | 101688698 A | 3/2010 |
| CN | 203442998 U | 2/2014 |
| CN | 105004087 A | 10/2015 |
| EP | 0402131 B1 | 10/1993 |
| FR | 3020130 A1 | 10/2015 |
| JP | H0931094 A | 12/1997 |
| JP | 2003050059 A | 2/2003 |
| JP | 2010216783 A | 9/2010 |
| JP | 2012167869 A | 9/2012 |
| KR | 101722384 B1 | 4/2017 |
| WO | WO-2007111594 A1 | 10/2007 |
| WO | WO-2008079128 A1 | 7/2008 |
| WO | WO-2008140454 A1 | 11/2008 |
| WO | WO-2009041959 A1 | 4/2009 |
| WO | WO-2009098899 A1 | 8/2009 |
| WO | WO-2013016404 A1 | 1/2013 |

OTHER PUBLICATIONS

U.S. Appl. No. 16/245,641, filed Jan. 11, 2019, Kirill M. Ignatiev et al.

U.S. Appl. No. 16/280,758, filed Feb. 20, 2019, Kirill M. Ignatiev et al.

U.S. Appl. No. 16/447,468, filed Jun. 20, 2019, Frank S. Wallis et al.

Clarksean, Randy, "A Phase Change Material Slurry System To Decrease Peak Air Conditioning Loads: Independent Assessment And Final EISG Report." Public Interest Energy Research, California Energy Commission, 2006 (81 pages).

International Search Report regarding International Application No. PCT/US2014/036592, dated Sep. 1, 2014.

Written Opinion of the International Searching Authority regarding International Application No. PCT/US2014/036592, dated Sep. 1, 2014.

Office Action regarding U.S. Appl. No. 14/267,224, dated Nov. 24, 2015.

Notice of Allowance regarding U.S. Appl. No. 14/267,224, dated Mar. 16, 2016.

Office Action regarding Chinese Patent Application No. 201480024924.3, dated Sep. 20, 2016. Translation provided by Unitalen Attorneys at Law.

Search Report regarding European Patent Application No. 14791184.6, dated Nov. 14, 2016.

International Search Report regarding International Application No. PCT/US2016/060990, dated Feb. 7, 2017.

Written Opinion of the International Searching Authority regarding International Application No. PCT/US2016/060990, dated Feb. 7, 2017.

Office Action regarding Chinese Patent Application No. 201480024924.3, dated Jun. 19, 2017. Translation provided by Unitalen Attorneys at Law.

Restriction Requirement regarding U.S. Appl. No. 15/339,012, dated Sep. 28, 2018.

Office Action regarding U.S. Appl. No. 15/339,012, dated Jan. 9, 2019.

International Search Report regarding International Application No. PCT/US2019/016518, dated May 21, 2019.

Written Opinion of the International Searching Authority regarding International Application No. PCT/US2019/016518, dated May 21, 2019.

International Search Report regarding International Application No. PCT/US2019/019216, dated Jun. 3, 2019.

Written Opinion of the International Searching Authority regarding International Application No. PCT/US2019/019216, dated Jun. 3, 2019.

Office Action regarding U.S. Appl. No. 15/339,012, dated Jun. 26, 2019.

Search Report regarding European Patent Application No. 16866861.4, dated Aug. 22, 2019.

International Search Report regarding International Application No. PCT/US2019/032478, dated Sep. 4, 2019.

(56) References Cited

OTHER PUBLICATIONS

Written Opinion of the International Searching Authority regarding International Application No. PCT/US2019/032478, dated Sep. 4, 2019.
Notice of Allowance regarding U.S. Appl. No. 15/339,012, dated Sep. 5, 2019.

* cited by examiner

CLIMATE-CONTROL SYSTEM WITH GROUND LOOP

CROSS-REFERENCE TO RELATED APPLICATIONS

This application claims the benefit of U.S. Provisional Application No. 62/671,743, filed on May 15, 2018, the entire disclosure of which is incorporated herein by reference.

FIELD

The present disclosure relates to a climate-control system with a ground loop.

BACKGROUND

This section provides background information related to the present disclosure and is not necessarily prior art.

A climate-control system such as, for example, a heat-pump system, a refrigeration system, or an air conditioning system, may include a fluid circuit having an outdoor heat exchanger, an indoor heat exchanger, an expansion device disposed between the indoor and outdoor heat exchangers, and one or more compressors circulating a working fluid (e.g., refrigerant or carbon dioxide) between the indoor and outdoor heat exchangers. The efficiency of climate-control systems may decline when outdoor air temperatures are high. The present disclosure provides a climate-control system that can operate more efficiently when outdoor air temperatures are high while also limiting energy consumption.

SUMMARY

This section provides a general summary of the disclosure, and is not a comprehensive disclosure of its full scope or all of its features.

The present disclosure provides a climate-control system that may include a working-fluid circuit and a cooling-fluid circuit. The working-fluid circuit may include a compressor, an outdoor heat exchanger, an expansion device, an indoor heat exchanger, and an intermediate heat exchanger conduit. The compressor compresses a working fluid. The outdoor heat exchanger may receive compressed working fluid from the compressor (when the climate-control system is operating in a cooling mode). The expansion device may be disposed downstream of the outdoor heat exchanger (when the climate-control system is operating in the cooling mode). The indoor heat exchanger may be disposed downstream of the expansion device and upstream of the compressor (when the climate-control system is operating in the cooling mode). The intermediate heat exchanger conduit may be disposed between the outdoor heat exchanger and the expansion device and may receive working fluid prior to the working fluid flowing through the expansion device. The cooling-fluid circuit may contain a cooling fluid in a heat transfer relationship with the working fluid in the intermediate heat exchanger conduit. The cooling-fluid circuit may include a pump and an underground heat exchanger conduit. The pump may selectively pump the cooling fluid. The underground heat exchanger conduit may be embedded in earth below an earth ground surface and may selectively receive the cooling fluid such that heat from the cooling fluid is transferred to the earth.

In some configurations of the climate-control system of the above paragraph, the cooling fluid is a different substance than the working fluid.

In some configurations of the climate-control system of one or more of the above paragraphs, the cooling fluid includes a phase change material.

In some configurations of the climate-control system of one or more of the above paragraphs, the cooling-fluid circuit further comprises a heat exchanger vessel including a cooling-fluid inlet and a cooling-fluid outlet. The heat exchanger vessel may receive the cooling fluid through the cooling-fluid inlet and at least transiently contain the cooling fluid such that the cooling fluid is in a heat-transfer relationship with the working fluid in the intermediate heat exchanger conduit.

In some configurations of the climate-control system of one or more of the above paragraphs, the intermediate heat exchanger conduit is at least partially disposed within the heat exchanger vessel.

In some configurations of the climate-control system of one or more of the above paragraphs, the cooling-fluid circuit further comprises a tank containing a volume of the cooling fluid. The tank may include a first inlet, a second inlet, a first outlet, and a second outlet. The first outlet may provide cooling fluid to the underground heat exchanger conduit. The first inlet may receive cooling fluid from the underground heat exchanger conduit. The second outlet may provide cooling fluid to the heat exchanger vessel. The second inlet may receive cooling fluid from the heat exchanger vessel.

In some configurations of the climate-control system of one or more of the above paragraphs, the cooling-fluid circuit is operable in a charge mode and in a discharge mode.

In some configurations of the climate-control system of one or more of the above paragraphs, in the charge mode: cooling fluid flows between the tank and the underground heat exchanger conduit, cooling fluid is restricted from flowing between the tank and the heat exchanger vessel, and working fluid is restricted from flowing through the intermediate heat exchanger conduit.

In some configurations of the climate-control system of one or more of the above paragraphs, in the discharge mode: cooling fluid flows between the tank and the heat exchanger vessel, cooling fluid is restricted from flowing between the tank and the underground heat exchanger conduit, and working fluid is allowed to flow through the intermediate heat exchanger conduit.

In some configurations of the climate-control system of one or more of the above paragraphs, the cooling-fluid circuit is switched between the charge mode and the discharge mode based one or both of an outdoor ambient air temperature and a temperature of working fluid flowing through the working-fluid circuit.

In some configurations of the climate-control system of one or more of the above paragraphs, the working-fluid circuit further comprises a bypass conduit disposed downstream of the outdoor heat exchanger and upstream of the expansion device. Working fluid flowing through the bypass conduit may bypass the intermediate heat exchanger conduit.

In some configurations of the climate-control system of one or more of the above paragraphs, the working-fluid circuit further comprises a flash tank including an inlet, a first outlet and a second outlet. The inlet may receive working fluid from one or both of the outdoor heat exchanger and the intermediate heat exchanger conduit. The first outlet may provide working fluid to the expansion device and the indoor heat exchanger. The second outlet may provide working fluid to a bypass conduit through which working fluid bypasses the indoor heat exchanger.

The present disclosure also provides a climate-control system that may include a working-fluid circuit and a cooling-fluid circuit. The working-fluid circuit may include a compressor, an outdoor heat exchanger, an expansion device, and an indoor heat exchanger. The compressor compresses a working fluid. The outdoor heat exchanger may receive compressed working fluid from the compressor (when the climate-control system is operating in a cooling mode). The expansion device may be disposed downstream of the outdoor heat exchanger (when the climate-control system is operating in the cooling mode). The indoor heat exchanger may be disposed downstream of the expansion device and upstream of the compressor (when the climate-control system is operating in the cooling mode). The cooling-fluid circuit may contain a cooling fluid in a heat transfer relationship with working fluid in the working-fluid circuit. The cooling-fluid circuit may include an underground heat exchanger conduit embedded in earth below an earth ground surface. The underground heat exchanger conduit may selectively receive the cooling fluid such that heat from the cooling fluid is transferred to the earth.

In some configurations of the climate-control system of the above paragraph, the cooling fluid is a different substance than the working fluid.

In some configurations of the climate-control system of one or more of the above paragraphs, the cooling fluid includes a phase change material.

In some configurations of the climate-control system of one or more of the above paragraphs, the working-fluid circuit includes an intermediate heat exchanger conduit disposed between the outdoor heat exchanger and the expansion device and receiving working fluid prior to the working fluid flowing through the expansion device.

In some configurations of the climate-control system of one or more of the above paragraphs, the cooling-fluid circuit further comprises a heat exchanger vessel including a cooling-fluid inlet and a cooling-fluid outlet. The heat exchanger vessel may receive the cooling fluid through the cooling-fluid inlet and at least transiently contain the cooling fluid such that the cooling fluid is in a heat-transfer relationship with the working fluid in the intermediate heat exchanger conduit.

In some configurations of the climate-control system of one or more of the above paragraphs, the intermediate heat exchanger conduit is at least partially disposed within the heat exchanger vessel.

In some configurations of the climate-control system of one or more of the above paragraphs, the cooling-fluid circuit is operable in a charge mode and in a discharge mode.

In some configurations of the climate-control system of one or more of the above paragraphs, in the charge mode: cooling fluid flows between the heat exchanger vessel and the underground heat exchanger conduit, and working fluid is restricted from flowing through the intermediate heat exchanger conduit.

In some configurations of the climate-control system of one or more of the above paragraphs, in the discharge mode: cooling fluid is restricted from flowing between the heat exchanger vessel and the underground heat exchanger conduit, and working fluid is allowed to flow through the intermediate heat exchanger conduit.

In some configurations of the climate-control system of one or more of the above paragraphs, the cooling-fluid circuit is switched between the charge mode and the discharge mode based one or both of an outdoor ambient air temperature and a temperature of working fluid flowing through the working-fluid circuit.

In some configurations of the climate-control system of one or more of the above paragraphs, the cooling-fluid circuit further comprises a tank containing a volume of the cooling fluid. The tank may include a first inlet, a second inlet, a first outlet, and a second outlet. The first outlet may provide cooling fluid to the underground heat exchanger conduit. The first inlet may receive cooling fluid from the underground heat exchanger conduit. The second outlet may provide cooling fluid to the heat exchanger vessel. The second inlet may receive cooling fluid from the heat exchanger vessel.

In some configurations of the climate-control system of one or more of the above paragraphs, the working-fluid circuit further comprises a bypass conduit disposed downstream of the outdoor heat exchanger and upstream of the expansion device. Working fluid flowing through the bypass conduit may bypass the intermediate heat exchanger conduit.

In some configurations of the climate-control system of one or more of the above paragraphs, the cooling-fluid circuit includes a second heat exchanger conduit through which cooling fluid flows and is in a heat transfer relationship with working fluid flowing through the outdoor heat exchanger.

In some configurations of the climate-control system of one or more of the above paragraphs, the cooling-fluid circuit further comprises a tank containing a volume of the cooling fluid. The tank may include a first inlet, a second inlet, a first outlet, and a second outlet. The first outlet may provide cooling fluid to the underground heat exchanger conduit. The first inlet may receive cooling fluid from the underground heat exchanger conduit. The second outlet may provide cooling fluid to the second heat exchanger conduit. The second inlet may receive cooling fluid from the second heat exchanger conduit.

In some configurations of the climate-control system of one or more of the above paragraphs, the working-fluid circuit further comprises a flash tank including an inlet, a first outlet and a second outlet. The inlet may receive working fluid from the outdoor heat exchanger. The first outlet may provide working fluid to the expansion device and the indoor heat exchanger. The second outlet may provide working fluid to a bypass conduit through which working fluid bypasses the indoor heat exchanger.

The present disclosure also provides a method that may include circulating a working fluid through a working-fluid circuit including a compressor, an outdoor heat exchanger, an expansion device, and an indoor heat exchanger; transferring heat from the working fluid to a cooling fluid while maintaining fluid isolation between the working fluid and the cooling fluid; and selectively pumping the cooling fluid through an underground heat exchanger conduit that is embedded in earth below an earth ground surface such that heat is transferred from the cooling fluid to the earth.

In some configurations of the method of the above paragraph, the cooling fluid is a different substance than the working fluid.

In some configurations of the method of one or more of the above paragraphs, the cooling fluid includes a phase change material.

In some configurations of the method of one or more of the above paragraphs, the working-fluid circuit includes an intermediate heat exchanger conduit disposed between the outdoor heat exchanger and the expansion device and receiving working fluid prior to the working fluid flowing through the expansion device.

In some configurations of the method of one or more of the above paragraphs, the cooling fluid flows through a cooling-fluid circuit. The cooling-fluid circuit may include the underground heat exchanger conduit and a heat exchanger vessel. The heat exchanger vessel may include a cooling-fluid inlet and a cooling-fluid outlet. The heat exchanger vessel may receive the cooling fluid through the cooling-fluid inlet and at least transiently containing the cooling fluid such that the cooling fluid is in a heat-transfer relationship with the working fluid in the intermediate heat exchanger conduit.

In some configurations of the method of one or more of the above paragraphs, the intermediate heat exchanger conduit is at least partially disposed within the heat exchanger vessel.

In some configurations of the method of one or more of the above paragraphs, the cooling-fluid circuit further comprises a tank containing a volume of the cooling fluid. The tank may include a first inlet, a second inlet, a first outlet, and a second outlet. The first outlet may provide cooling fluid to the underground heat exchanger conduit. The first inlet may receive cooling fluid from the underground heat exchanger conduit. The second outlet may provide cooling fluid to the heat exchanger vessel. The second inlet may receive cooling fluid from the heat exchanger vessel.

In some configurations of the method of one or more of the above paragraphs, in the charge mode: cooling fluid flows between the tank and the underground heat exchanger conduit, cooling fluid is restricted from flowing between the tank and the heat exchanger vessel, and working fluid is restricted from flowing through the intermediate heat exchanger conduit.

In some configurations of the method of one or more of the above paragraphs, in the discharge mode: cooling fluid flows between the tank and the heat exchanger vessel, cooling fluid is restricted from flowing between the tank and the underground heat exchanger conduit, and working fluid is allowed to flow through the intermediate heat exchanger conduit.

In some configurations of the method of one or more of the above paragraphs, the method includes switching the cooling-fluid circuit between the charge mode and the discharge mode based one or both of an outdoor ambient air temperature and a temperature of working fluid flowing through the working-fluid circuit.

In some configurations of the method of one or more of the above paragraphs, the working-fluid circuit further comprises a bypass conduit disposed downstream of the outdoor heat exchanger and upstream of the expansion device. Working fluid flowing through the bypass conduit may bypass the intermediate heat exchanger conduit.

In some configurations of the method of one or more of the above paragraphs, the cooling fluid flows through a cooling-fluid circuit, wherein the cooling-fluid circuit includes the underground heat exchanger conduit and a second heat exchanger conduit. The cooling fluid flowing through the second heat exchanger conduit may be in a heat transfer relationship with working fluid flowing through the outdoor heat exchanger.

In some configurations of the method of one or more of the above paragraphs, the cooling-fluid circuit further comprises a tank containing a volume of the cooling fluid. The tank includes a first inlet, a second inlet, a first outlet, and a second outlet. The first outlet may provide cooling fluid to the underground heat exchanger conduit. The first inlet may receive cooling fluid from the underground heat exchanger conduit. The second outlet may provide cooling fluid to the second heat exchanger conduit. The second inlet may receive cooling fluid from the second heat exchanger conduit.

In some configurations of the method of one or more of the above paragraphs, the cooling-fluid circuit is operable in a charge mode and in a discharge mode.

In some configurations of the method of one or more of the above paragraphs, in the charge mode: cooling fluid flows between the tank and the underground heat exchanger conduit, and cooling fluid is restricted from flowing between the tank and the second heat exchanger conduit.

In some configurations of the method of one or more of the above paragraphs, in the discharge mode: cooling fluid flows between the tank and the second heat exchanger conduit, and cooling fluid is restricted from flowing between the tank and the underground heat exchanger conduit.

In some configurations of the method of one or more of the above paragraphs, the method includes switching between the charge mode and the discharge mode based one or both of an outdoor ambient air temperature and a temperature of working fluid flowing through the working-fluid circuit.

In some configurations of the method of one or more of the above paragraphs, the working-fluid circuit may include a flash tank including an inlet, a first outlet and a second outlet. The inlet may receive working fluid from the outdoor heat exchanger. The first outlet may provide working fluid to the expansion device and the indoor heat exchanger. The second outlet may provide working fluid to a bypass conduit through which working fluid bypasses the indoor heat exchanger.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
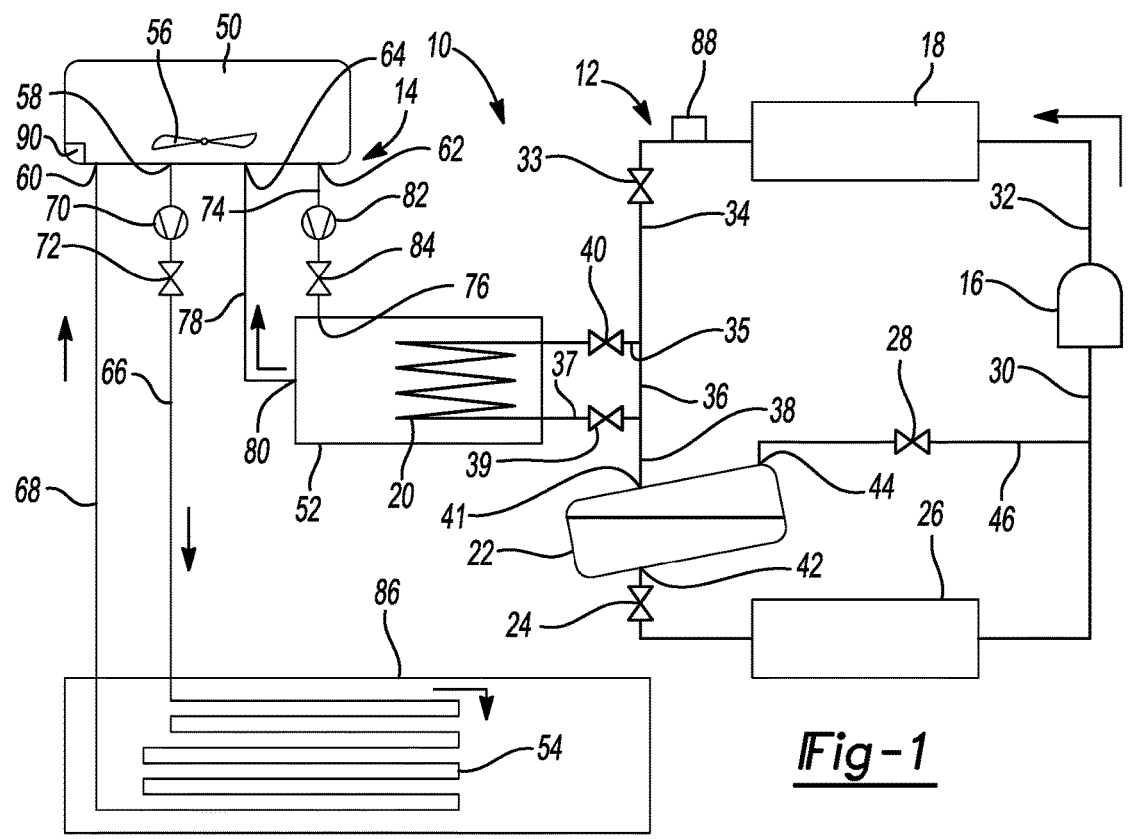
FIG. 1 is a schematic representation of a climate-control system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a climate-control system 10 is provided that may include a working-fluid circuit 12 and a cooling-fluid circuit 14. As will be described in more detail below, heat from working fluid flowing through the working-fluid circuit 12 may be selectively transferred to a cooling fluid flowing through the cooling-fluid circuit 14 to improve the efficiency of the working-fluid circuit 12.

The working-fluid circuit 12 may be a refrigeration system, an air-conditioning system, a heat-pump system, etc. The working-fluid circuit 12 may include a compressor 16, an outdoor heat exchanger (e.g., a condenser or gas cooler) 18, an intermediate heat exchanger conduit (e.g., a coiled or serpentine pipe) 20, a flash tank 22, a first expansion device 24, an indoor heat exchanger (e.g., an evaporator) 26, and a second expansion device 28. The compressor 16 may be any suitable type of compressor, such as a scroll compressor (e.g., including scrolls with intermeshing spiral wraps), a rotary compressor (e.g., with an eccentric rotor rotating within a cylinder, and with a reciprocating vane extending into the cylinder), a reciprocating compressor (e.g., with a piston reciprocating within a cylinder), or a centrifugal compressor (e.g., with an impeller, diffuser, and collector), for example.

During operation of the working-fluid circuit 12, the compressor 16 may draw suction-pressure working fluid (e.g., refrigerant, carbon dioxide, etc.) from a suction conduit 30, compress the working fluid to a higher pressure, and discharge the compressed working fluid into the discharge conduit 32. Working fluid in a discharge conduit 32 may flow through the outdoor heat exchanger 18 where heat the working fluid may be transferred to outdoor ambient air (e.g., air forced across the outdoor heat exchanger 18 by a fan, for example).

A first conduit 34 may be fluidly connected to the outdoor heat exchanger 18 such that working fluid from exiting the outdoor heat exchanger 18 may flow into the first conduit 34. In some configurations, a third expansion device 33 may be disposed along the first conduit 34 between the outdoor heat exchanger 18 and the intermediate heat exchanger conduit 20. The third expansion device 33 may be an expansion valve (e.g., a thermal expansion valve or an electronic expansion valve) or a capillary tube. The first conduit 34 may be fluidly connected to an inlet 35 of the intermediate heat exchanger conduit 20 and a first bypass conduit 36 such that the first conduit 34, the inlet 35 and the first bypass conduit 36 form a three-way junction. The first bypass conduit 36 and an outlet 37 of the intermediate heat exchanger conduit 20 may be fluidly connected to a second conduit 38 such that the first bypass conduit 36, the outlet 37 and the second conduit 38 form another three-way junction.

A first control valve 40 (e.g., a solenoid valve) may be disposed along or near the inlet 35 of the intermediate heat exchanger conduit 20 and may control fluid flow through the intermediate heat exchanger conduit 20. That is, the first control valve 40 may be movable between an open position allowing fluid flow through the intermediate heat exchanger conduit 20 and a closed position restricting or preventing fluid flow through the intermediate heat exchanger conduit 20. The first control valve 40 may be movable to one or more positions between the open and closed positions to allow a desired amount of fluid flow through the intermediate heat exchanger conduit 20. When the first control valve 40 is in the open position or in one of the positions between the open and closed positions, at least some of the working fluid from the first conduit 34 may flow into the inlet 35 and through the intermediate heat exchanger conduit 20 and another portion of the working fluid from the first conduit 34 may flow through the bypass conduit 36. The working fluid that flows through the first bypass conduit 36 bypasses the intermediate heat exchanger conduit 20.

In some configurations, the first control valve 40 may be a three-way valve disposed at the three-way junction of the first conduit 34, the inlet 35 and the first bypass conduit 36. In such configurations, the first control valve 40 may be movable to a first position to direct all of the working fluid from the first conduit 34 into the intermediate heat exchanger conduit 20, one or more second positions to direct some of the working fluid from the first conduit 34 into the intermediate heat exchanger conduit 20 and some of the working fluid from the first conduit 34 into the first bypass conduit 36, and a third position directing all of the working fluid from the first conduit 34 into the first bypass conduit 36.

Working fluid from the intermediate heat exchanger conduit 20 and/or working fluid from the first bypass conduit 36 may flow through the outlet 37 and into the second conduit 38. In some configurations, a service valve 39 may be disposed on or adjacent the outlet 37. The service valve 39 may be a solenoid valve (or any other electromechanical valve) or a manually actuated valve, for example. The service valve 39 may remain in an open position during operation of the working-fluid circuit 12 and may be closed during service or maintenance of the working-fluid circuit 12. The second conduit 38 may be fluidly connected to an inlet 41 of the flash tank 22. In the flash tank 22, liquid working fluid may be separate from gaseous working fluid.

Liquid working fluid may exit the flash tank 22 through a first outlet 42 of the flash tank 22 and may flow through the first expansion device 24. The first expansion device 24 may be an expansion valve (e.g., a thermal expansion valve or an electronic expansion valve) or a capillary tube, for example. The pressure and temperature of the working fluid drop as the working fluid flows through the first expansion device 24. From the first expansion device 24, the working fluid may flow through the indoor heat exchanger 26, where the working fluid absorbs heat from a space to be cooled. From the indoor heat exchanger 26, the working fluid flows to the suction conduit 30 and into the compressor 16.

Gaseous working fluid in the flash tank 22 may exit the flash tank 22 through a second outlet 44 of the flash tank 22 and may flow through the second expansion device 28 disposed on a second bypass conduit 46. The second expansion device 28 may be an expansion valve (e.g., a thermal expansion valve or an electronic expansion valve) or a capillary tube, for example. Working fluid flowing through the second bypass conduit 46 may bypass the indoor heat exchanger 26 and flow into the suction conduit 30 and into the compressor 16.

The cooling-fluid circuit 14 may include a slurry tank 50, a heat exchanger vessel (e.g., a tank) 52, and an underground heat exchanger conduit 54. The slurry tank 50 may contain a volume of a cooling fluid. The cooling fluid may be a different substance than the working fluid flowing through the working-fluid circuit 12. For example, the cooling fluid could be a liquid slurry including capsules or particles of a phase change material (PCM) dispersed in water (or another suitable liquid). In some configurations, the PCM in the cooling fluid may be or include microencapsulated PCM, such as hexadecane, for example. Other suitable PCM and/or other suitable cooling fluids could be used. In some configurations, a mixer 56 (e.g., one or more spinning blades) may be disposed within the slurry tank 50 to stir and mix the cooling fluid in the slurry tank 50.

The slurry tank 50 may include a first outlet 58, a first inlet 60, a second outlet 62, and a second inlet 64. The first outlet 58 of the slurry tank 50 may be fluidly connected to a first supply conduit 66 that is also fluidly connected to one end (an inlet) of the underground heat exchanger conduit 54. The first inlet 60 of the slurry tank 50 may be fluidly connected to a first return conduit 68 that is also fluidly connected to another end (an outlet) of the underground heat exchanger conduit 54. A first pump 70 may be disposed along the first supply conduit 66. The first pump 70 may pump the cooling fluid from the first outlet 58 of the slurry tank 50, through the first supply conduit 66, through the underground heat exchanger conduit 54, through the first return conduit 68 and back into the slurry tank 50 via the first inlet 60. A second control valve 72 may also be disposed along the first supply conduit 66 and may be movable between open and closed positions to control the flow of the cooling fluid through the underground heat exchanger conduit 54. The slurry tank 50, the first supply conduit 66, the underground heat exchanger conduit 54, and the first return conduit 68 may cooperate to form a ground loop through which the cooling fluid flows to cool the cooling fluid and solidify the PCM.

The second outlet 62 of the slurry tank 50 may be fluidly connected to a second supply conduit 74 that is also fluidly connected to a cooling-fluid inlet 76 of the heat exchanger vessel 52. The second inlet 64 of the slurry tank 50 may be fluidly connected to a second return conduit 78 that is also fluidly connected to a cooling-fluid outlet 80 of the heat exchanger vessel 52. A second pump 82 may be disposed along the second supply conduit 74. The second pump 82 may pump the cooling fluid from the second outlet 62 of the slurry tank 50, through the second supply conduit 74, through the heat exchanger vessel 52, through the second return conduit 78 and back into the slurry tank 50 via the second inlet 64. A third control valve 84 may also be disposed along the second supply conduit 74 and may be movable between open and closed positions to control the flow of the cooling fluid between the slurry tank 50 and the heat exchanger vessel 52.

The intermediate heat exchanger conduit 20 of the working-fluid circuit 12 may extend into the heat exchanger vessel 52. That is, at least a portion of the intermediate heat exchanger conduit 20 may be disposed within the heat exchanger vessel 52 and in contact with cooling fluid that is at least transiently disposed within the heat exchanger vessel 52. In this manner, heat from the working fluid in the intermediate heat exchanger conduit 20 can be absorbed by the cooling fluid in the heat exchanger vessel 52 while the working fluid remains fluidly isolated from the cooling fluid (i.e., there is no mixing or direct contact between the working fluid and the cooling fluid). In some configurations, the intermediate heat exchanger conduit 20 could be attached to the outside of the heat exchanger vessel 52 instead of being disposed within the heat exchanger vessel 52.

The underground heat exchanger conduit 54 may be a coiled or serpentine network of pipe that is buried underground (i.e., buried in earth below a ground surface 86 of the earth). The underground heat exchanger conduit 54 may be buried at a depth below the ground surface 86 at which a temperature of the earth (e.g., soil) is approximately constant throughout the year and is lower than the solidification temperature of the PCM in the cooling fluid. For example, in some climates and soil compositions, the underground heat exchanger conduit 54 may be buried at a depth of approximately 5-8 feet (approximately 1.5-2.5 meters).

With continued reference to FIG. 1, operation of the climate-control system 10 will be described in detail. When the working-fluid circuit 12 is operating (or more specifically, operating in a cooling mode in embodiments where the working-fluid circuit 12 is a reversible heat pump), compressed working fluid from the compressor 16 may flow through the outdoor heat exchanger 18, where outdoor ambient air absorbs heat from the working fluid. When outdoor ambient air temperatures are sufficiently high, the outdoor ambient air may not remove enough heat from the working fluid in the outdoor heat exchanger 18 to ensure efficient operation of the working-fluid circuit 12. Under such conditions, a control module may move the first control valve 40 to the open position (or to a position between the fully open and fully closed positions) to allow at least some of the working fluid downstream of the outdoor heat exchanger 18 to flow through the intermediate heat exchanger conduit 20 before flowing to the flash tank 22.

The cooling-fluid circuit 14 may be operable in a charge mode and in a discharge mode. In the charge mode, the control module may operate the first pump 70 and open the second control valve 72 to allow cooling fluid from the slurry tank 50 to flow through the first supply conduit 66, through the underground heat exchanger conduit 54, and back into the slurry tank 50 via the first return conduit 68. As the cooling fluid flows through the underground heat exchanger conduit 54, heat from the cooling fluid may be absorbed by the earth (e.g., soil) surrounding the underground heat exchanger conduit 54. In this manner, the PCM in the cooling fluid can solidify (e.g., change to a solid phase) as the cooling fluid flows through the underground heat exchanger conduit 54. In some configurations, the control module may close the first control valve 40 during the charge mode to prevent or restrict the flow of working fluid through the intermediate heat exchanger conduit 20 during the charge mode. In some configurations, the control module may shut down the second pump 82 and close the third control valve 84 in the charge mode to restrict or prevent the flow of cooling fluid between the slurry tank 50 and the heat exchanger vessel 52.

In the discharge mode, the control module may operate the second pump 82 and open the third control valve 84 to allow cooling fluid from the slurry tank 50 to flow through the second supply conduit 74, through the heat exchanger vessel 52, and back into the slurry tank 50 via the second return conduit 78. The control module may open the first control valve 40 during the discharge mode to allow the flow of working fluid through the intermediate heat exchanger conduit 20. In this manner, during the discharge mode, heat from the working fluid in the intermediate heat exchanger conduit 20 can be absorbed by the cooling fluid in the heat exchanger vessel 52. In some configurations, the control module may shut down the first pump 70 and close the second control valve 72 in the discharge mode to restrict or prevent the flow of cooling fluid between the slurry tank 50 and the underground heat exchanger conduit 54.

In some configurations, the cooling-fluid circuit 14 may be operable in a third mode in which the control module may operate both of the pumps 70, 82 concurrently and open both of the second and third control valves 72, 84 to allow simultaneous flow of cooling fluid between the slurry tank 50 and the underground heat exchanger conduit 54 and flow of cooling fluid between the slurry tank 50 and the heat exchanger vessel 52, thereby simultaneously charging (i.e., cooling in the underground heat exchanger conduit 54) a portion of the cooling fluid and circulating another portion of the cooling fluid through the heat exchanger vessel 52 to absorb heat from the working fluid in the working-fluid circuit 12.

The control module may switch between the charge mode and the discharge mode based on information received from an outdoor air temperature sensor (not shown) or from a sensor 88 (disposed along a coil of the outdoor heat exchanger 18 or along the first conduit 34, for example) that measures a temperature (or a pressure) of working fluid in the working-fluid circuit 12. In configurations in which the control module switches between the modes based on outdoor air temperature data, the control module may operate the cooling-fluid circuit 14 in the discharge mode when the outdoor ambient air temperature is above a predetermined temperature (e.g., a temperature at which the working fluid will not be adequately cooled in the outdoor heat exchanger 18 to maintain a desired level of efficiency). In such configurations, the control module may shutdown the second pump 82 when the outdoor ambient air temperature drops below the predetermined temperature or when the working-fluid circuit 12 shuts down (e.g., due to a cooling demand being met, for example).

In configurations in which the control module switches between the modes based on information from the sensor 88, the control module may operate the cooling-fluid circuit 14 in the discharge mode when the temperature of the working fluid measured by the sensor 88 (or calculated from a pressure measurement from the sensor 88) is above a predetermined temperature (e.g., a temperature indicating that the working fluid is not being adequately cooled in the outdoor heat exchanger 18 to maintain a desired level of efficiency). In such configurations, the control module may shutdown the second pump 82 when the temperature of the working fluid measured by the sensor 88 drops below the predetermined temperature or when the working-fluid circuit 12 shuts down (e.g., due to a cooling demand being met, for example).

Another temperature sensor 90 may be disposed in the slurry tank 50, for example, and may measure the temperature of the cooling fluid. When the temperature of the cooling fluid rises above another predetermined temperature value, the control module may operate the cooling-fluid circuit 14 in the charge mode or in the third mode. In some configurations, the control module may wait to operate the cooling-fluid circuit 14 in the charge mode during times of the day when a load on the electrical power grid is relatively low (e.g., at night).

Figure 2:
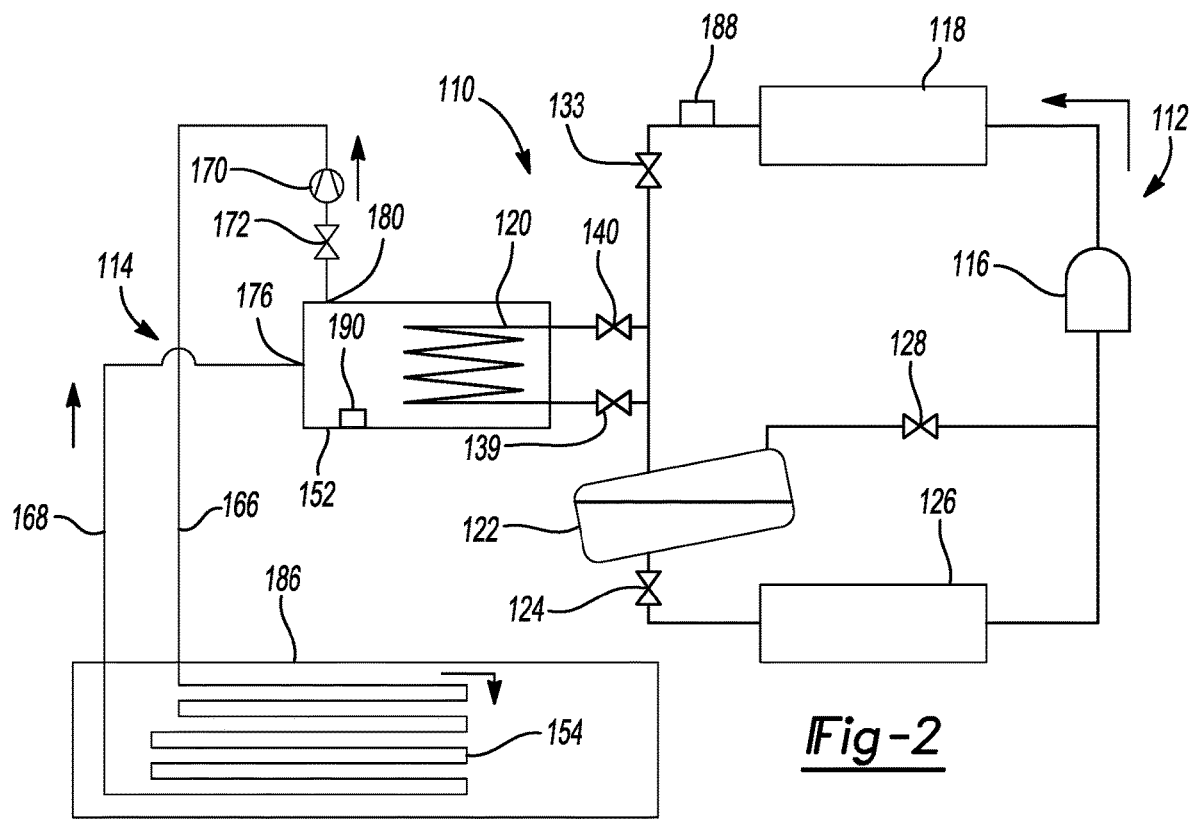
FIG. 2 is a schematic representation of another climate-control system according to the principles of the present disclosure.

Referring now to FIG. 2, another climate-control system 110 is provided. The climate-control system 110 may include a working-fluid circuit 112 and a cooling-fluid circuit 114. The structure and function of the working-fluid circuit 112 and its components may be similar or identical to that of the working-fluid circuit 12 described above, and therefore, will not be described again in detail. Briefly, the working-fluid circuit 12 may circulate a working fluid (e.g., refrigerant, carbon dioxide, etc.) and may include a compressor 116, an outdoor heat exchanger 118, an intermediate heat exchanger conduit 120, a flash tank 122, a first expansion device 124, an indoor heat exchanger 126, a second expansion device 128, a third expansion device 133, and a service valve 139.

As described above with respect to the cooling-fluid circuit 14, a cooling fluid may circulate throughout the cooling-fluid circuit 114. The cooling fluid may be a different substance than the working fluid flowing through the working-fluid circuit 112. As described above, the cooling fluid could be a liquid slurry including capsules or particles of a phase change material (PCM) dispersed in water (or another suitable liquid). In some configurations, the PCM in the cooling fluid may be or include microencapsulated PCM, such as hexadecane, for example. Other suitable PCM and/or other suitable cooling fluids could be used.

The cooling-fluid circuit 114 may include a heat exchanger vessel (e.g., a tank) 152 and an underground heat exchanger conduit 154. The structure and function of the underground heat exchanger conduit 154 may be similar or identical to that of the underground heat exchanger conduit 54. That is, the underground heat exchanger conduit 154 may be a coiled or serpentine network of pipe that is buried underground (i.e., buried in earth below a ground surface 86 of the earth). The underground heat exchanger conduit 154 may be buried at a depth below the ground surface 186 at which a temperature of the earth (e.g., soil) is approximately constant throughout the year and is lower than the solidification temperature of the PCM in the cooling fluid. For example, in some climates and soil compositions, the underground heat exchanger conduit 154 may be buried at a depth of approximately 5-8 feet (approximately 1.5-2.5 meters).

The heat exchanger vessel 152 may include a cooling-fluid inlet 176 and a cooling-fluid outlet 180. The heat exchanger vessel 152 may contain (at least transiently) a volume of the cooling fluid. In some configurations, a mixer (like the mixer 56) may be disposed within the heat exchanger vessel 152 to stir and mix the cooling fluid therein.

The cooling-fluid outlet 180 of the heat exchanger vessel 152 may be fluidly connected to a first conduit 166. The first conduit 166 is also fluidly connected to one end (an inlet) of the underground heat exchanger conduit 154. The cooling-fluid inlet 176 of the heat exchanger vessel 152 may be fluidly connected to a second conduit 168. The second conduit 168 is also fluidly connected to another end (an outlet) of the underground heat exchanger conduit 154. A pump 170 may be disposed along the first supply conduit 166. The pump 170 may pump the cooling fluid from the cooling-fluid outlet 180 of the heat exchanger vessel 152, through the first conduit 166, through the underground heat exchanger conduit 154, through the second conduit 168 and back into the heat exchanger vessel 152 via the cooling-fluid inlet 176. A control valve 172 may also be disposed along the first conduit 166 and may be movable between open and closed positions to control the flow of the cooling fluid between the heat exchanger vessel 152 and the underground heat exchanger conduit 154. The heat exchanger vessel 152, the first conduit 166, the underground heat exchanger conduit 154, and the second conduit 168 may cooperate to form a ground loop through which the cooling fluid flows to cool the cooling fluid and solidify the PCM.

The cooling-fluid circuit 114 may be operable in a charge mode and in a discharge mode. In the charge mode, a control module may operate the pump 170 and open the control valve 172 to allow cooling fluid from the heat exchanger vessel 152 to flow through the first conduit 166, through the underground heat exchanger conduit 154, and back into the heat exchanger vessel 152 via the second conduit 168. As the cooling fluid flows through the underground heat exchanger conduit 154, heat from the cooling fluid may be absorbed by the earth (e.g., soil) surrounding the underground heat exchanger conduit 154. In this manner, the PCM in the cooling fluid can solidify (e.g., change to a solid phase) as the cooling fluid flows through the underground heat exchanger conduit 154. In some configurations, the control module may close a control valve 140 of the working-fluid circuit 112 during the charge mode to prevent or restrict the flow of working fluid through the intermediate heat exchanger conduit 120 during the charge mode.

In the discharge mode, the control module may shut down the pump 170 and close the control valve 172 to restrict or prevent the flow of cooling fluid between the heat exchanger vessel 152 and the underground heat exchanger conduit 154. The control module may open the control valve 140 during the discharge mode to allow the flow of working fluid through the intermediate heat exchanger conduit 120. In this manner, during the discharge mode, heat from the working fluid in the intermediate heat exchanger conduit 120 can be absorbed by the cooling fluid in the heat exchanger vessel 152.

In some configurations, the cooling-fluid circuit 14 may be operable in a third mode in which the control module may operate the pump 170 and open both of the control valves 172, 140 to allow simultaneous flow of cooling fluid between the heat exchanger vessel 152 and the underground heat exchanger conduit 154 and flow of working fluid through the intermediate heat exchanger conduit 120. In this manner, some of the cooling fluid in the cooling-fluid circuit 114 can be cooled in the underground heat exchanger conduit 154 while some of the cooling fluid in the cooling-fluid circuit 114 absorbs heat from the working fluid in the intermediate heat exchanger conduit 120.

The control module may switch between the charge mode and the discharge mode based on information received from an outdoor air temperature sensor (not shown) or from a sensor 188 (similar or identical to the sensor 88) that measures a temperature (or a pressure) of working fluid in the working-fluid circuit 112. In configurations in which the control module switches between the modes based on outdoor air temperature data, the control module may operate the cooling-fluid circuit 114 in the discharge mode when the outdoor ambient air temperature is above a predetermined temperature (e.g., a temperature at which the working fluid will not be adequately cooled in the outdoor heat exchanger 118 to maintain a desired level of efficiency). In such configurations, the control module may close the control valve 140 when the outdoor ambient air temperature drops below the predetermined temperature or when the working-fluid circuit 112 shuts down (e.g., due to a cooling demand being met, for example).

In configurations in which the control module switches between the modes based on information from the sensor 188, the control module may operate the cooling-fluid circuit 114 in the discharge mode when the temperature of the working fluid measured by the sensor 188 (or calculated from a pressure measurement from the sensor 188) is above a predetermined temperature (e.g., a temperature indicating that the working fluid is not being adequately cooled in the outdoor heat exchanger 118 to maintain a desired level of efficiency). In such configurations, the control module may close the control valve 140 when the temperature of the working fluid measured by the sensor 188 drops below the predetermined temperature or when the working-fluid circuit 112 shuts down (e.g., due to a cooling demand being met, for example).

Another temperature sensor 190 may be disposed in the heat exchanger vessel 152, for example, and may measure the temperature of the cooling fluid. When the temperature of the cooling fluid rises above another predetermined temperature value, the control module may operate the cooling-fluid circuit 114 in the charge mode or in the third mode. In some configurations, the control module may wait to operate the cooling-fluid circuit 114 in the charge mode during times of the day when a load on the electrical power grid is relatively low (e.g., at night).

Figure 3:
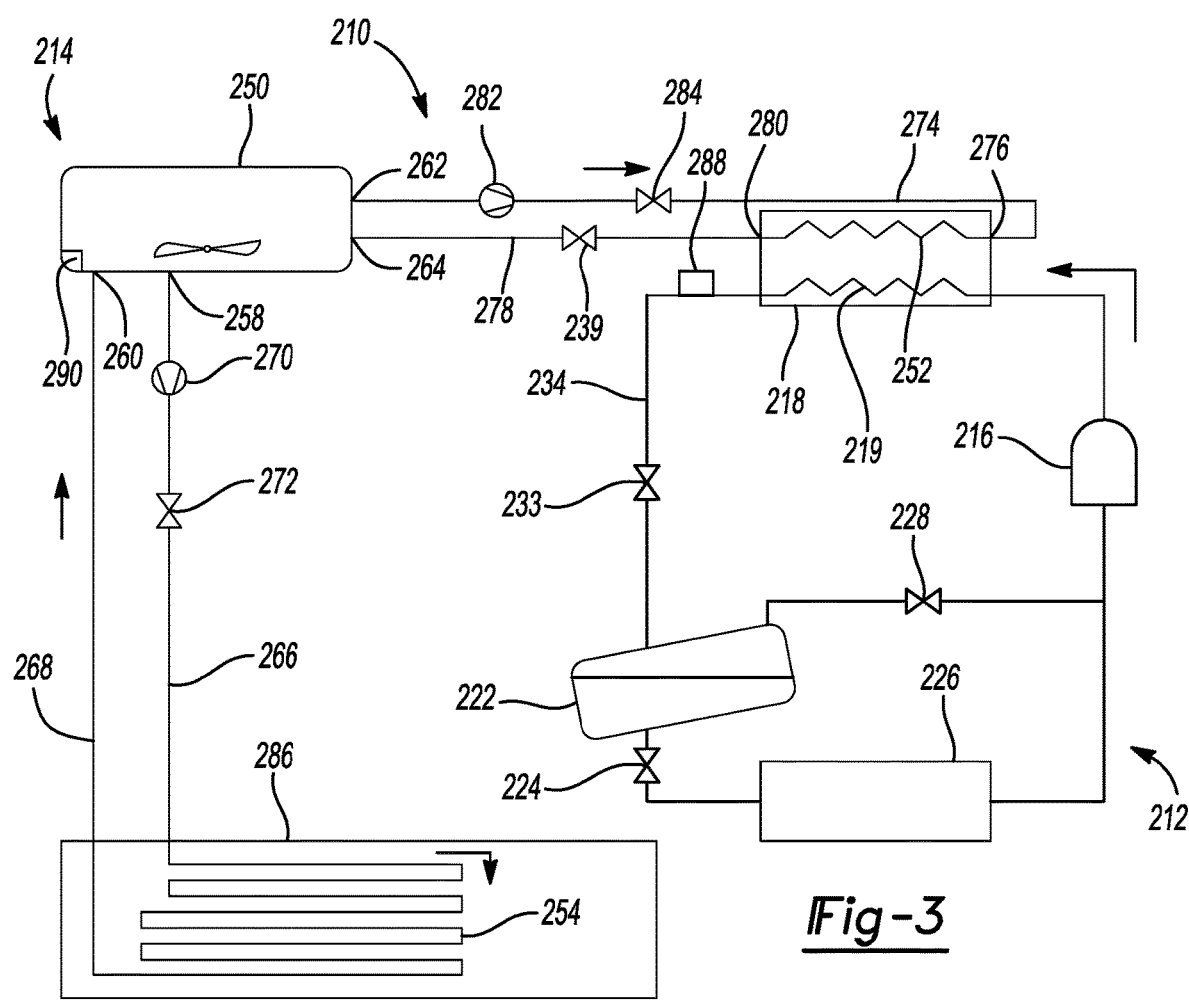
FIG. 3 is a schematic representation of yet another climate-control system according to the principles of the present disclosure.

Referring now to FIG. 3, another climate-control system 210 is provided. The climate-control system 210 may include a working-fluid circuit 212 and a cooling-fluid circuit 214. The structure and function of the working-fluid circuit 212 and its components may be similar or identical to that of the working-fluid circuit 12 described above, apart from any exceptions described below and/or shown in the figures. Therefore, similar features might not be described again in detail. The working-fluid circuit 212 may circulate a working fluid (e.g., refrigerant, carbon dioxide, etc.) and may include a compressor 216, an outdoor heat exchanger 218, a flash tank 222, a first expansion device 224, an indoor heat exchanger 226, a second expansion device 228, and a third expansion device 233. The cooling-fluid circuit 214 shown in FIG. 3 does not include the intermediate heat exchanger conduit 20 or control valve 40.

As described above with respect to the cooling-fluid circuit 14, a cooling fluid may circulate throughout the cooling-fluid circuit 214. The cooling fluid may be a different substance than the working fluid flowing through the working-fluid circuit 212. As described above, the cooling fluid could be a liquid slurry including capsules or particles of a phase change material (PCM) dispersed in water (or another suitable liquid). In some configurations, the PCM in the cooling fluid may be or include microencapsulated PCM, such as hexadecane, for example. Other suitable PCM and/or other suitable cooling fluids could be used.

The cooling-fluid circuit 214 may include a slurry tank 250 (similar or identical to the slurry tank 50 described above), an underground heat exchanger conduit 254 (similar or identical to the underground heat exchanger conduit 54 described above), and a second heat exchanger conduit or vessel 252.

The slurry tank 250 may include a first outlet 258, a first inlet 260, a second outlet 262, and a second inlet 264. The first outlet 258 of the slurry tank 250 may be fluidly connected to a first supply conduit 266 that is also fluidly connected to one end (an inlet) of the underground heat exchanger conduit 254. The first inlet 260 of the slurry tank 250 may be fluidly connected to a first return conduit 268 that is also fluidly connected to another end (an outlet) of the underground heat exchanger conduit 254. A first pump 270 may be disposed along the first supply conduit 266. The first pump 270 may pump the cooling fluid from the first outlet 258 of the slurry tank 250, through the first supply conduit 266, through the underground heat exchanger conduit 254, through the first return conduit 268 and back into the slurry tank 250 via the first inlet 260. A control valve 272 may be disposed along the first supply conduit 266 and may be movable between open and closed positions to control the flow of the cooling fluid through the underground heat exchanger conduit 254. The slurry tank 250, the first supply conduit 266, the underground heat exchanger conduit 254, and the first return conduit 268 may cooperate to form a ground loop through which the cooling fluid flows to cool the cooling fluid and solidify the PCM.

The second outlet 262 of the slurry tank 250 may be fluidly connected to a second supply conduit 274 that is also fluidly connected to a cooling-fluid inlet 276 of the second heat exchanger conduit 252. The second inlet 264 of the slurry tank 250 may be fluidly connected to a second return conduit 278 that is also fluidly connected to a cooling-fluid outlet 280 of the second heat exchanger conduit 252. A second pump 282 may be disposed along the second supply conduit 274. The second pump 282 may pump the cooling fluid from the second outlet 262 of the slurry tank 250, through the second supply conduit 274, through the second heat exchanger conduit 252, through the second return conduit 278 and back into the slurry tank 250 via the second inlet 264. A control valve 284 may also be disposed along the second supply conduit 274 and may be movable between open and closed positions to control the flow of the cooling fluid between the slurry tank 250 and the second heat exchanger conduit 252. In some configurations, a service valve 239 may be disposed along the second return conduit 278. The service valve 239 may be a solenoid valve (or any other electromechanical valve) or a manually actuated valve, for example. The service valve 239 may remain in an open position during operation of the cooling-fluid circuit 214 and may be closed during service or maintenance of the cooling-fluid circuit 214.

The underground heat exchanger conduit 254 may be a coiled or serpentine network of pipe that is buried underground (i.e., buried in earth below a ground surface 286 of the earth, as described above with respect to the underground heat exchanger conduit 54).

The second heat exchanger conduit 252 may be mounted to or disposed within the outdoor heat exchanger. That is, the second heat exchanger conduit 252 may be in a heat transfer relationship with a first heat exchanger conduit or coil 219 of the outdoor heat exchanger 218. The first heat exchanger conduit 219 of the outdoor heat exchanger 218 may be a part of the working-fluid circuit 212 and may receive high-temperature and high-pressure working fluid from the compressor 216. Working fluid from the first heat exchanger conduit 219 may flow to the flash tank 222, for example. Heat from the working fluid in the first heat exchanger conduit 219 may be absorbed by cooling fluid in the second heat exchanger conduit 252. Cooling fluid in the second heat exchanger conduit 252 is fluidly isolated from the working fluid in the first heat exchanger conduit 219 (i.e., there is no fluid communication between the first and second heat exchanger conduits 219, 252).

The cooling-fluid circuit 214 may be operable in a charge mode and in a discharge mode. In the charge mode, the control module may operate the first pump 270 and open the control valve 272 to allow cooling fluid from the slurry tank 250 to flow through the first supply conduit 266, through the underground heat exchanger conduit 254, and back into the slurry tank 250 via the first return conduit 268. As the cooling fluid flows through the underground heat exchanger conduit 254, heat from the cooling fluid may be absorbed by the earth (e.g., soil) surrounding the underground heat exchanger conduit 254. In this manner, the PCM in the cooling fluid can solidify (e.g., change to a solid phase) as the cooling fluid flows through the underground heat exchanger conduit 254. In some configurations, the control module may shut down the second pump 282 and close the control valve 284 in the charge mode to restrict or prevent the flow of cooling fluid between the slurry tank 250 and the second heat exchanger conduit 252.

In the discharge mode, the control module may operate the second pump 282 and open the control valve 284 to allow cooling fluid from the slurry tank 250 to flow through the second supply conduit 274, through the second heat exchanger conduit 252, and back into the slurry tank 250 via the second return conduit 278. In this manner, during the discharge mode, heat from the working fluid in the first heat exchanger conduit 219 of the outdoor heat exchanger 218 can be absorbed by the cooling fluid in the second heat exchanger conduit 252. In some configurations, the control module may shut down the first pump 270 and close the control valve 272 in the discharge mode to restrict or prevent the flow of cooling fluid between the slurry tank 250 and the underground heat exchanger conduit 254.

In some configurations, the cooling-fluid circuit 214 may be operable in a third mode in which the control module may operate both of the pumps 270, 282 concurrently and open both of the control valves 272, 284 to allow simultaneous flow of cooling fluid between the slurry tank 250 and the underground heat exchanger conduit 254 and flow of cooling fluid between the slurry tank 250 and the second heat exchanger conduit 252, thereby simultaneously charging (i.e., cooling in the underground heat exchanger conduit 254) a portion of the cooling fluid and circulating another portion of the cooling fluid through the second heat exchanger conduit 252 to absorb heat from the working fluid in the working-fluid circuit 212.

The control module may switch between the charge mode and the discharge mode based on information received from an outdoor air temperature sensor (not shown) or from a sensor 288 (disposed along the first heat exchanger conduit 219 of the outdoor heat exchanger 218 or along a conduit 234 downstream of the first heat exchanger conduit 219, for example) that measures a temperature (or a pressure) of working fluid in the working-fluid circuit 212. In configurations in which the control module switches between the modes based on outdoor air temperature data, the control module may operate the cooling-fluid circuit 214 in the discharge mode when the outdoor ambient air temperature is above a predetermined temperature (e.g., a temperature at which the working fluid will not be adequately cooled in the outdoor heat exchanger 218 by air alone to maintain a desired level of efficiency). In such configurations, the control module may shutdown the second pump 282 when the outdoor ambient air temperature drops below the predetermined temperature or when the working-fluid circuit 212 shuts down (e.g., due to a cooling demand being met, for example).

In configurations in which the control module switches between the modes based on information from the sensor 288, the control module may operate the cooling-fluid circuit 214 in the discharge mode when the temperature of the working fluid measured by the sensor 288 (or calculated from a pressure measurement from the sensor 288) is above a predetermined temperature (e.g., a temperature indicating that the working fluid is not being adequately cooled by air alone in the outdoor heat exchanger 218 to maintain a desired level of efficiency). In such configurations, the control module may shutdown the second pump 282 when the temperature of the working fluid measured by the sensor 288 drops below the predetermined temperature or when the working-fluid circuit 212 shuts down (e.g., due to a cooling demand being met, for example).

Another temperature sensor 290 may be disposed in the slurry tank 250, for example, and may measure the temperature of the cooling fluid. When the temperature of the cooling fluid rises above another predetermined temperature value, the control module may operate the cooling-fluid circuit 214 in the charge mode or in the third mode. In some configurations, the control module may wait to operate the cooling-fluid circuit 214 in the charge mode during times of the day when a load on the electrical power grid is relatively low (e.g., at night).

In the climate-control systems 10, 110, 210, the control module may be in wired or wireless communication with and control operation of some or all of the compressor, pump(s), valves, sensors, fans, and/or mixers shown in the figures and/or described above.

In this application, including the definitions below, the term "module" or the term "control module" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The figures and descriptions above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112 (f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A climate-control system comprising:
   a working-fluid circuit including:
      a compressor compressing a working fluid;
      an outdoor heat exchanger receiving compressed working fluid from the compressor;
      an expansion device disposed downstream of the outdoor heat exchanger;
      an indoor heat exchanger disposed downstream of the expansion device and upstream of the compressor; and
      an intermediate heat exchanger conduit disposed between the outdoor heat exchanger and the expansion device and receiving working fluid prior to the working fluid flowing through the expansion device; and
   a cooling-fluid circuit containing a cooling fluid in a heat transfer relationship with the working fluid in the intermediate heat exchanger conduit, the cooling-fluid circuit including:
      a pump selectively pumping the cooling fluid; and
      an underground heat exchanger conduit embedded in earth below an earth ground surface and selectively receiving the cooling fluid such that heat from the cooling fluid is transferred to the earth,
   wherein the cooling-fluid circuit further comprises a heat exchanger vessel including a cooling-fluid inlet and a cooling-fluid outlet, the heat exchanger vessel receiving the cooling fluid through the cooling-fluid inlet and at least transiently containing the cooling fluid such that the cooling fluid is in a heat-transfer relationship with the working fluid in the intermediate heat exchanger conduit,
   wherein the intermediate heat exchanger conduit is at least partially disposed within the heat exchanger vessel, and
   wherein the cooling-fluid circuit further comprises a tank containing a volume of the cooling fluid, wherein the tank includes a first inlet, a second inlet, a first outlet, and a second outlet, wherein the first outlet provides cooling fluid to the underground heat exchanger conduit, wherein the first inlet receives cooling fluid from the underground heat exchanger conduit, wherein the second outlet provides cooling fluid to the heat exchanger vessel, and wherein the second inlet receives cooling fluid from the heat exchanger vessel.

2. The climate-control system of claim 1, wherein the cooling fluid is a different substance than the working fluid.

3. The climate-control system of claim 1, wherein the cooling fluid includes a phase change material.

4. The climate-control system of claim 1, wherein the cooling-fluid circuit is operable in a charge mode and in a discharge mode, and wherein:
   in the charge mode: cooling fluid flows between the tank and the underground heat exchanger conduit, cooling fluid is restricted from flowing between the tank and the heat exchanger vessel, and working fluid is restricted from flowing through the intermediate heat exchanger conduit, and
   in the discharge mode: cooling fluid flows between the tank and the heat exchanger vessel, cooling fluid is restricted from flowing between the tank and the underground heat exchanger conduit, and working fluid is allowed to flow through the intermediate heat exchanger conduit.

5. The climate-control system of claim 4, wherein the cooling-fluid circuit is switched between the charge mode and the discharge mode based one or both of an outdoor ambient air temperature and a temperature of working fluid flowing through the working-fluid circuit.

6. The climate-control system of claim 1, wherein the working-fluid circuit further comprises a bypass conduit disposed downstream of the outdoor heat exchanger and upstream of the expansion device, wherein working fluid flowing through the bypass conduit bypasses the intermediate heat exchanger conduit.

7. The climate-control system of claim 1, wherein the working-fluid circuit further comprises a flash tank including an inlet, a first outlet and a second outlet, wherein the inlet receives working fluid from one or both of the outdoor heat exchanger and the intermediate heat exchanger conduit, wherein the first outlet provides working fluid to the expansion device and the indoor heat exchanger, and wherein the second outlet provides working fluid to a bypass conduit through which working fluid bypasses the indoor heat exchanger.

8. A climate-control system comprising:
a working-fluid circuit including:
a compressor compressing a working fluid;
an outdoor heat exchanger receiving compressed working fluid from the compressor;
an expansion device disposed downstream of the outdoor heat exchanger; and
an indoor heat exchanger disposed downstream of the expansion device and upstream of the compressor; and
a cooling-fluid circuit containing a cooling fluid in a heat transfer relationship with working fluid in the working-fluid circuit, the cooling-fluid circuit including an underground heat exchanger conduit embedded in earth below an earth ground surface, the underground heat exchanger conduit selectively receiving the cooling fluid such that heat from the cooling fluid is transferred to the earth,
wherein the cooling fluid is a different substance than the working fluid,
wherein the cooling fluid includes a phase change material,
wherein the working-fluid circuit includes an intermediate heat exchanger conduit disposed between the outdoor heat exchanger and the expansion device and receiving working fluid prior to the working fluid flowing through the expansion device,
wherein the cooling-fluid circuit further comprises a heat exchanger vessel including a cooling-fluid inlet and a cooling-fluid outlet, the heat exchanger vessel receiving the cooling fluid through the cooling-fluid inlet and at least transiently containing the cooling fluid such that the cooling fluid is in a heat-transfer relationship with the working fluid in the intermediate heat exchanger conduit,
wherein the intermediate heat exchanger conduit is at least partially disposed within the heat exchanger vessel, and
wherein the cooling-fluid circuit further comprises a tank containing a volume of the cooling fluid, wherein the tank includes a first inlet, a second inlet, a first outlet, and a second outlet, wherein the first outlet provides cooling fluid to the underground heat exchanger conduit, wherein the first inlet receives cooling fluid from the underground heat exchanger conduit, wherein the second outlet provides cooling fluid to the heat exchanger vessel, and wherein the second inlet receives cooling fluid from the heat exchanger vessel.

9. The climate-control system of claim 8, wherein the cooling-fluid circuit is operable in a charge mode and in a discharge mode, and wherein:
in the charge mode: cooling fluid flows between the heat exchanger vessel and the underground heat exchanger conduit, and working fluid is restricted from flowing through the intermediate heat exchanger conduit, and
in the discharge mode: cooling fluid is restricted from flowing between the heat exchanger vessel and the underground heat exchanger conduit, and working fluid is allowed to flow through the intermediate heat exchanger conduit.

10. The climate-control system of claim 9, wherein the cooling-fluid circuit is switched between the charge mode and the discharge mode based one or both of an outdoor ambient air temperature and a temperature of working fluid flowing through the working-fluid circuit.

11. The climate-control system of claim 8, wherein the working-fluid circuit further comprises a bypass conduit disposed downstream of the outdoor heat exchanger and upstream of the expansion device, wherein working fluid flowing through the bypass conduit bypasses the intermediate heat exchanger conduit.

12. The climate-control system of claim 8, wherein the working-fluid circuit further comprises a flash tank including an inlet, a first outlet and a second outlet, wherein the inlet receives working fluid from the outdoor heat exchanger, wherein the first outlet provides working fluid to the expansion device and the indoor heat exchanger, and wherein the second outlet provides working fluid to a bypass conduit through which working fluid bypasses the indoor heat exchanger.

13. A climate-control system comprising:
a working-fluid circuit including:
a compressor compressing a working fluid;
an outdoor heat exchanger receiving compressed working fluid from the compressor;
an expansion device disposed downstream of the outdoor heat exchanger; and
an indoor heat exchanger disposed downstream of the expansion device and upstream of the compressor; and
a cooling-fluid circuit containing a cooling fluid in a heat transfer relationship with working fluid in the working-fluid circuit, the cooling-fluid circuit including an underground heat exchanger conduit embedded in earth below an earth ground surface, the underground heat exchanger conduit selectively receiving the cooling fluid such that heat from the cooling fluid is transferred to the earth,
wherein the cooling-fluid circuit includes a second heat exchanger conduit through which cooling fluid flows and is in a heat transfer relationship with working fluid flowing through the outdoor heat exchanger, and
wherein the cooling-fluid circuit further comprises a tank containing a volume of the cooling fluid, wherein the tank includes a first inlet, a second inlet, a first outlet, and a second outlet, wherein the first outlet provides cooling fluid to the underground heat exchanger conduit, wherein the first inlet receives cooling fluid from the underground heat exchanger conduit, wherein the second outlet provides cooling fluid to the second heat exchanger conduit, and wherein the second inlet receives cooling fluid from the second heat exchanger conduit.

14. The climate-control system of claim 13, wherein the cooling-fluid circuit is operable in a charge mode and in a discharge mode, and wherein:
in the charge mode: cooling fluid flows between the heat exchanger vessel and the underground heat exchanger conduit, and working fluid is restricted from flowing through the intermediate heat exchanger conduit, and
in the discharge mode: cooling fluid is restricted from flowing between the heat exchanger vessel and the underground heat exchanger conduit, and working fluid is allowed to flow through the intermediate heat exchanger conduit.

15. The climate-control system of claim 14, wherein the cooling-fluid circuit is switched between the charge mode and the discharge mode based one or both of an outdoor ambient air temperature and a temperature of working fluid flowing through the working-fluid circuit.

16. The climate-control system of claim 13, wherein the working-fluid circuit further comprises a flash tank including an inlet, a first outlet and a second outlet, wherein the inlet receives working fluid from the outdoor heat exchanger, wherein the first outlet provides working fluid to the expansion device and the indoor heat exchanger, and wherein the second outlet provides working fluid to a bypass conduit through which working fluid bypasses the indoor heat exchanger.

* * * * *